United States Patent
Bar Hen (10) Patent No.: US 10,710,167 B2
(45) Date of Patent: Jul. 14, 2020

(54) NEGATIVE FINISH TURNING INSERT WITH CHIP FORMING ARRANGEMENT

(71) Applicant: Iscar, Ltd., Tefen (IL)

(72) Inventor: Meir Bar Hen, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/666,659

(22) Filed: Aug. 2, 2017

(65) Prior Publication Data

US 2019/0039146 A1 Feb. 7, 2019

(51) Int. Cl.
*B23B 27/14* (2006.01)

(52) U.S. Cl.
CPC .......... *B23B 27/145* (2013.01); *B23B 27/143* (2013.01); *B23B 2200/0433* (2013.01); *B23B 2200/0447* (2013.01); *B23B 2200/0452* (2013.01); *B23B 2200/083* (2013.01); *B23B 2200/087* (2013.01); *B23B 2200/165* (2013.01); *B23B 2200/245* (2013.01); *B23B 2200/3627* (2013.01); *B23B 2222/36* (2013.01); *B23B 2222/88* (2013.01)

(58) Field of Classification Search
CPC ............ B23B 27/145; B23B 2200/083; B23B 2200/087; B23B 2200/323; B23B 2200/201
See application file for complete search history.

(56) References Cited

U.S. PATENT DOCUMENTS

| | | |
|---|---|---|
| 4,344,725 A | 8/1982 | Seidel |
| 4,856,942 A | 8/1989 | Bernadic et al. |
| 4,880,338 A | 11/1989 | Stashko |
| 4,941,780 A | 7/1990 | Takahashi |
| 5,032,049 A | 7/1991 | Hessman et al. |
| 5,044,840 A | 9/1991 | Fouquer et al. |
| 5,122,017 A | 6/1992 | Niebauer |
| 5,147,159 A | 9/1992 | Lowe et al. |
| 5,192,171 A | 3/1993 | Ther et al. |
| 5,193,947 A | 3/1993 | Bernadic et al. |
| 5,230,591 A | 7/1993 | Katbi et al. |
| 5,282,703 A | 2/1994 | Itaba et al. |
| 5,456,557 A * | 10/1995 | Bernadic ............... B23B 27/143 407/114 |
| 5,476,346 A | 12/1995 | Lundström |

(Continued)

FOREIGN PATENT DOCUMENTS

| | | |
|---|---|---|
| CN | 201455319 U | 5/2010 |
| EP | 318000 | 5/1989 |

(Continued)

OTHER PUBLICATIONS

International Search Report dated Oct. 22, 2018, issued in PCT counterpart application (No. PCT/IL2018/050723).

(Continued)

*Primary Examiner* — Alan Snyder (74) *Attorney, Agent, or Firm* — Womble Bond Dickinson (US) LLP (57) ABSTRACT

A turning insert for machining both Inconel and Titanium workpieces. The insert includes a chip forming arrangement including only a single v-shaped groove. The groove includes a specific depth and position to improve machining of both Inconel and Titanium work pieces.

20 Claims, 5 Drawing Sheets

(56) References Cited

U.S. PATENT DOCUMENTS

| | | | |
|---|---|---|---|
| 5,584,616 A | * | 12/1996 | Katbi .................... B23B 27/143 407/114 |
| 5,628,590 A | | 5/1997 | Beeghly et al. |
| 5,725,334 A | | 3/1998 | Paya |
| 5,743,681 A | | 4/1998 | Wiman et al. |
| 5,947,651 A | | 9/1999 | Murakami et al. |
| 6,039,515 A | | 3/2000 | Lamberg |
| 6,065,907 A | | 5/2000 | Ghosh et al. |
| 6,123,488 A | | 9/2000 | Kasperik et al. |
| 6,234,726 B1 | | 5/2001 | Okada et al. |
| 7,182,555 B2 | | 2/2007 | Kitagawa et al. |
| 7,909,546 B2 | | 3/2011 | Nada et al. |
| 7,976,251 B2 | | 7/2011 | Iyori et al. |
| 8,251,618 B2 | | 8/2012 | Kobayashi |
| 8,342,779 B2 | | 1/2013 | Kobayashi |
| 8,727,676 B2 | | 5/2014 | Löf |
| 2005/0019111 A1 | | 1/2005 | Kitagawa et al. |
| 2007/0059110 A1 | | 3/2007 | Choi et al. |
| 2007/0189861 A1 | | 8/2007 | Muren et al. |
| 2010/0266353 A1 | | 10/2010 | Zitzlaff et al. |
| 2010/0329800 A1 | | 12/2010 | Edler et al. |
| 2011/0070040 A1 | | 3/2011 | Park et al. |
| 2011/0142555 A1 | | 6/2011 | Yamazaki et al. |
| 2011/0222974 A1 | | 9/2011 | Park et al. |
| 2012/0177452 A1 | | 7/2012 | Konta |
| 2013/0236257 A1 | | 9/2013 | Nada et al. |
| 2013/0272808 A1 | | 10/2013 | Cohen |
| 2015/0283617 A1 | | 10/2015 | Nagarajan et al. |
| 2015/0375303 A1 | | 12/2015 | Fujii |

FOREIGN PATENT DOCUMENTS

| | | |
|---|---|---|
| EP | 567899 | 11/1993 |
| EP | 1852200 | 11/2007 |
| JP | H02 53306 U | 4/1990 |
| JP | H06 55312 | 3/1994 |
| JP | H06-190612 | 7/1994 |
| JP | H09 174309 A | 7/1997 |
| JP | 2004-106150 | 4/2004 |
| JP | 2004-216510 | 8/2004 |
| JP | 2009-113197 A | 5/2009 |
| WO | WO 94/25208 | 11/1994 |
| WO | WO 95/32071 | 11/1995 |
| WO | WO 2014/192798 | 12/2014 |
| WO | WO 2015/081353 | 6/2015 |

OTHER PUBLICATIONS

Written Opinion dated Oct. 22, 2018, issued in PCT counterpart application (No. PCT/IL2018/050723).

* cited by examiner

NEGATIVE FINISH TURNING INSERT WITH CHIP FORMING ARRANGEMENT

FIELD OF THE INVENTION

The subject matter of the present application relates to an insert for machining operations, in particular a negative turning insert comprising a chip forming arrangement for finish depth machining operations. More specifically the chip forming arrangement is optimized for machining difficult to machine materials with high heat-transfer properties.

BACKGROUND OF THE INVENTION

This particular application relates to negative inserts, i.e. inserts having a peripheral surface extending perpendicular to the rake surface(s) which it is connected too. It will be understood that the entire focus of this application is chip formation, and, as known in the art, negative inserts and non-negative inserts form different chips even if mounted in a tool to present the same insert angle to a workpiece. Negative inserts are well known in the art and are categorized with the letter "N" in ISO standards.

More specifically, the chip forming arrangement is for finish-depth (hereinafter simply "finish") machining, which for the purposes of the present application, are considered to have a depth of cut up to 2.5 mm. At greater depths, the same chip forming arrangement is not expected to provide the same beneficial performance, even if enlarged proportionately.

The chip forming arrangement subject the present application was comparatively tested against several other designs, some of which were based off prior art chip forming arrangements, which is discussed in detail hereinafter.

It is an object of the present invention to provide a new and improved chip forming arrangement.

SUMMARY OF THE INVENTION

The chip forming arrangement according to the subject matter of the present application has been developed for an unusual purpose of performing optimally for machining both Inconel and Titanium workpieces. Notably, even though both Inconel and Titanium have similar high heat transfer properties, nonetheless have notably different properties when being machined. To elaborate, out of the several designs tested, the claimed design performed worse than other designs at machining Inconel, and worse than some of the designs at machining Titanium, but better on average than all of the designs (taking into account the factors of chip forming, tool life at comparatively low depth of cut, tool life at comparatively high depth of cut) at machining both materials.

In accordance with a first aspect of the subject matter of the present application, there is provided a turning insert for comprising a chip forming arrangement including only a single v-shaped groove. The groove being configured for finish depth machining of both Inconel and Titanium work pieces.

More precisely, the insert comprises: opposite first and second surfaces; a peripherally extending peripheral surface connecting and extending perpendicular to the first and second surfaces; a peripheral edge formed at an intersection of the peripheral surface and the first surface, the peripheral edge having at least one corner comprising a corner radius; a cutting edge formed along at least a portion of the peripheral edge, and extending along the corner radius as well as first and second edge portions connected to and extending from different sides of the corner; a bisector plane perpendicular to the first and second surfaces and bisecting the corner radius; a bisector point defined at an intersection of the cutting edge and the bisector plane; a horizontal plane perpendicular to the peripheral surface and intersecting the bisector point; a downward direction directed perpendicularly from the horizontal plane towards the second surface; an upward direction opposite to the downward direction; an inward direction directed into the insert from an intersection of the bisector plane and the peripheral surface; and a chip forming arrangement formed at the first surface, adjacent to the cutting edge, and consisting of a single, continuous v-shaped groove extending on both sides of the corner radius, in a top view; the groove comprising: a curved groove portion adjacent the corner radius, and two straight extension portions connected to either side of the curved groove portion; a descending surface extending directly from the cutting edge in a downward-inward direction to a lowest point of the groove; and an ascending surface extending from the lowest point in an upward-inward direction to a highest point; wherein along the bisector plane: the lowest point is a first horizontal distance D1 from the bisector point, fulfilling the condition 0.50 mm≤D1≤1.20 mm; the lowest point is a first vertical distance H1 downward from the horizontal plane, fulfilling the condition 0.15 mm≤H1≤0.30 mm; and the highest point is a second horizontal distance D2 from the bisector point, fulfilling the condition 1.10 mm≤D2≤1.70 mm.

As will be shown below with reference to other designs tested, even similar appearing chip forming arrangements behaved surprisingly differently when the specific location of the elements above was changed even by small amounts.

Preferably, the first horizontal distance D1 fulfills the condition 0.70 mm≤D1≤1.10 mm. More preferable values are with a greater proximity to D1=0.85 mm.

Preferably, the vertical distance H1 fulfills the condition 0.20 mm≤H1≤0.30 mm. More preferable values are with a greater proximity to H1=0.25 mm.

Preferably, the second horizontal distance D2 fulfills the condition 1.20 mm≤D2≤1.60 mm. More preferable values are with a greater proximity to D1=1.40 mm. For the purposes of the specification and claims, the second horizontal distance D2 may include curved and straight portions of a single ascending surface, which participate in chip formation while machining using finish conditions. The descending and ascending surfaces of the present design are configured to be the only surfaces which participates in chip formation when machining at finish conditions. This will be elaborated below in relation to different exemplary elements (land, cutting edge length extending horizontally, transition relief surface to abutment surface).

Preferably, the second horizontal distance D2 is the largest distance compared to comparative distances taken along planes other than the bisector plane. Preferably, the v-shaped groove is widest along the bisector plane (i.e. having the greatest horizontal distance D2), and becomes progressively narrower along at least a portion of the groove's straight extension portions, in a direction away from the curved groove portion.

Preferably, the chip forming arrangement is symmetric about the bisector plane.

Preferably, the ascending surface, along the bisector plane, extends in a smooth concave manner.

Preferably, a majority of the descending surface, along the bisector plane, extends in a straight manner.

Preferably, the highest point is located upward of the horizontal plane.

Preferably, the highest point is a second vertical distance H2 from the lowest point, fulfilling the condition that H2 is equal to H1±0.05 mm (H2=H1±0.05 mm).

Preferably, the highest point is within 0.1 mm of the horizontal plane.

Preferably, the highest point is above the horizontal plane.

Preferably, the cutting edge has a circular radius. Specifically, preferably, an E-type honed shape. Stated differently, the cutting edge can preferably be honed to be circularly radiused.

Preferably, the first vertical distance H1 can be the largest distance compared to comparative distances taken along planes other than the bisector plane. Preferably, the v-shaped groove can be deepest (i.e. having the greatest first vertical distance H1) along the bisector plane, and becomes progressively shallower along at least a portion of the groove's straight extension portions, in a direction away from the curved groove portion.

Preferably the v-shaped groove is widest along the bisector plane (P1), and becomes progressively narrower along at least a portion of the groove's straight extension portions, in a direction away from the curved groove portion.

Preferably, the cutting edge adjacent the chip forming arrangement extends parallel to the horizontal plane. It will be understood that this feature, as with the other features above, only relates to the working area that a finish-depth insert works at. Accordingly, more precisely, it can be stated that the cutting edge adjacent the chip forming arrangement extends parallel to the horizontal plane within a horizontal distance of 2.5 mm from the bisector point. To elaborate, further than that distance there is no relevance to the chip forming arrangement.

Preferably, the insert has one or more additional chip forming arrangement having the same features but formed at a different location, e.g. the second surface. For example, at each corner of the first and second surfaces there can be formed a chip forming arrangement having the same features as the chip forming arrangement defined above.

It will be understood that the statement "a descending surface extending directly from the cutting edge" should be understood as meaning that the descending surface, or stated differently the chip forming arrangement, is devoid of a land. For the purposes of the specification and claims a land is only considered such when it has a horizontal dimension of at least 0.1 mm since a dimension less than that is not expected to have significant detrimental effect on chip formation.

BRIEF DESCRIPTION OF THE DRAWINGS

For a better understanding of the subject matter of the present application, and to show how the same may be carried out in practice, reference will now be made to the accompanying scale drawings, in which.

DETAILED DESCRIPTION

Figure 1A:
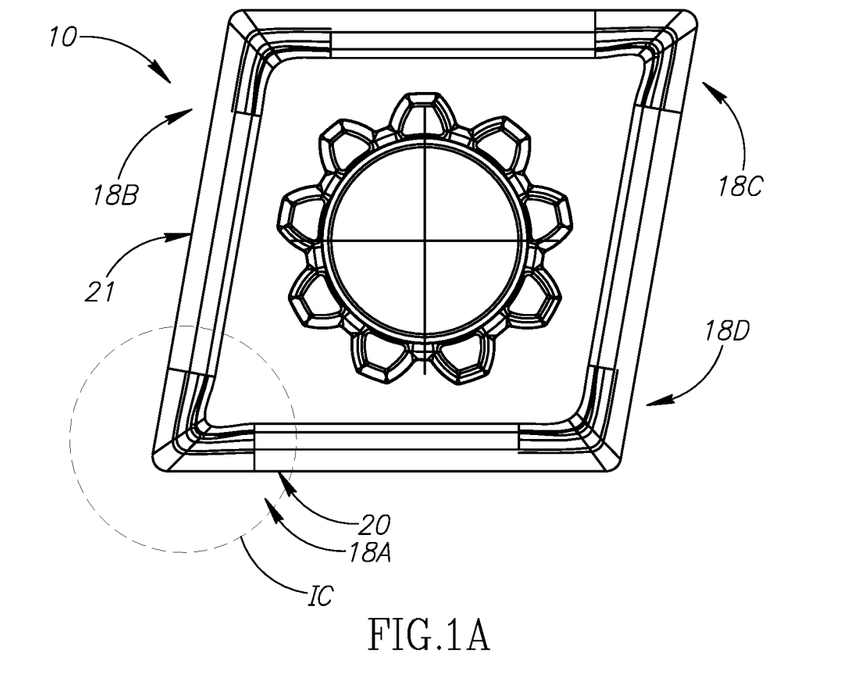
FIG. 1A is a top view of an insert comprising chip forming arrangements in accordance with the subject matter of the present application.
Figure 1B:
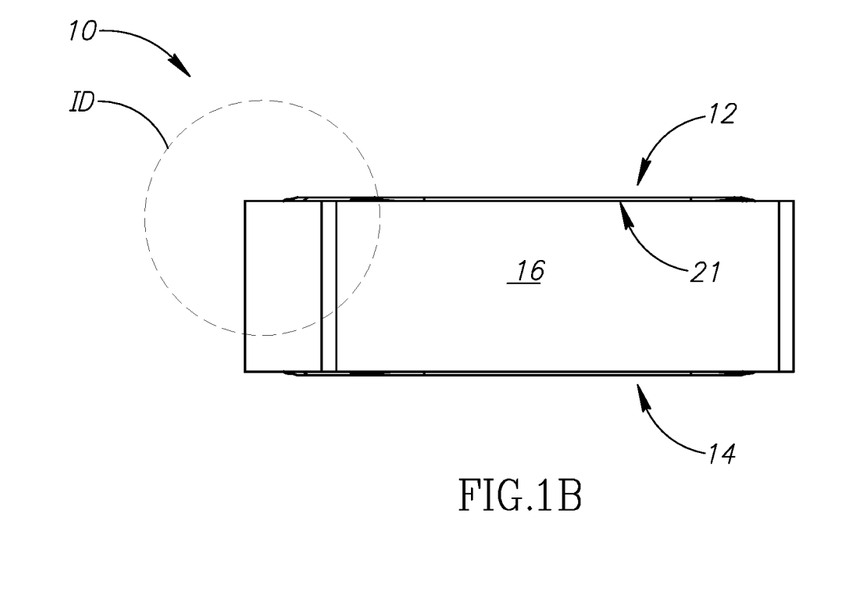
FIG. 1B is a side view of the insert in FIG. 1A.

Reference is made to FIGS. 1A and 1B, illustrating a finish turning insert 10 for machining operations. The insert 10 is typically made of extremely hard and wear-resistant material such as cemented carbide.

The insert 10 can comprise opposite first and second surfaces 12, 14 and a peripherally extending peripheral surface 16 connected to the first and second surfaces 12, 14. The first and second surfaces 12, 14 in this non-limiting example are identical and so only the first surface 12 will be described.

The insert 10 comprises at least one corner 18A, 18B, 18C, 18D.

The insert 10 comprises at least one chip forming arrangement 20 associated with the corner 18A and the first surface 12. Unless stated otherwise, the following description will only be directed to one chip forming arrangement (i.e. the arrangement designated with the numeral "20"), however, it will be understood that each corner of the insert 10, at either or both of the first and second surfaces 12, 14 can have a corresponding chip forming arrangement.

In any case, in the present example the insert 10 has a corresponding chip forming arrangement on each corner thereof and at both the first and second surfaces 12, 14 of each corner, i.e. eight such arrangements. It will also be understood that the first surface 12 (and the second surface 14 in the example shown) is a rake surface, over which chips (not shown) cut from a cut workpiece (not shown) flow.

It will be understood that the peripheral surface 16 constitutes a relief surface of the insert 10. As shown the peripheral surface 16 extends perpendicular to the first and second surfaces 12, 14. Stated differently, the insert 10 is a so-called negative insert.

Figure 1C:
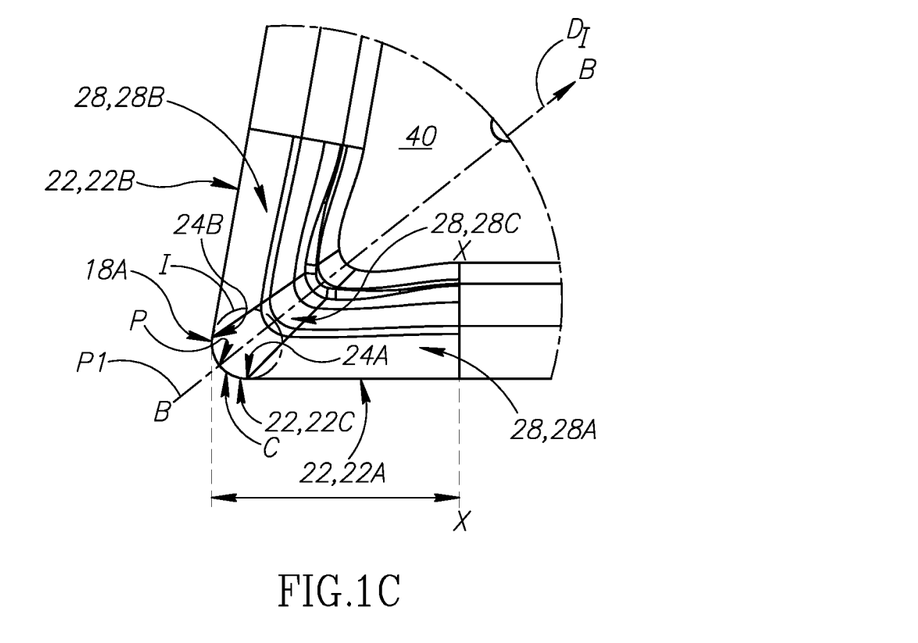
FIG. 1C is an enlarged view of an encircled portion IC in FIG. 1A.
Figure 1D:
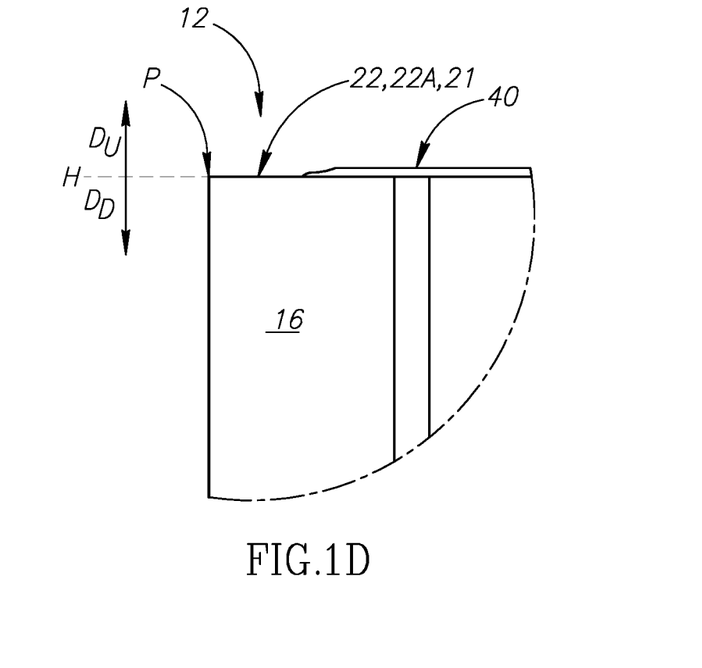
FIG. 1D is an enlarged view of an encircled portion ID in FIG. 1B.

Referring to FIGS. 1C and 1D, the corner 18A can define a corner radius C. More precisely, the corner radius C is an arc-shaped portion along an inscribed circle I of the corner 18A in the top view of the first surface 12.

Referring to FIGS. 1A-1D, a peripheral edge 21 is formed between the first surface 12 and the peripheral surface 16. A cutting edge 22 is formed along at least a portion of the peripheral edge 21 and can comprise first and second sub-cutting edges 22A, 22B, and a third sub-cutting edge 22C extending along the corner 18A and connected to the first and second sub-cutting edges 22A, 22B.

First and second connection points 24A, 24B (FIG. 4A) of the third sub-cutting edge 22C and first and second sub-cutting edges 22A, 22B are located where the curvature of the corner 18A transitions to the straight first and second sub-cutting edges 22A, 22B.

In FIG. 1C, a bisector plane P1, which extends along line B-B is shown. The bisector plane P1 is perpendicular to the first and second surfaces 12, 14 and bisects the corner radius C (i.e. theoretically dividing the corner 18A into equal halves). The chip forming arrangement 20 can preferably be symmetric about the bisector plane P1 as shown.

A bisector point P is theoretically defined at an intersection of the cutting edge and the bisector plane P1.

An inward direction DI is defined directed into the insert 10 from an intersection of the bisector plane B and the peripheral surface 16 and into the insert 10.

A horizontal plane H (FIG. 1D) extends perpendicular to the peripheral surface 16 and intersecting the bisector point P. In the same figure it can be understood that the cutting edge 22 extends parallel with the horizontal plane H.

A downward direction DD is defined directed perpendicularly from the horizontal plane H towards the second surface 14. An upward direction DU is defined in an opposite to the downward direction DD.

As best shown in FIG. 1C, at the corner 18A, the chip forming arrangement 20 comprises only a single, continuous v-shaped groove 28 extending on both sides of the corner radius C. To elaborate, a v-shape is shown when viewed in a top view (FIG. 1C). Similar to the cutting edge 22, the groove 28 comprises two straight extension portions 28A, 28B extending along adjacent first and second sub-cutting edges 22A, 22B, and a curved groove portion 28C adjacent to the third sub-cutting edge 22C.

Figure 2A:
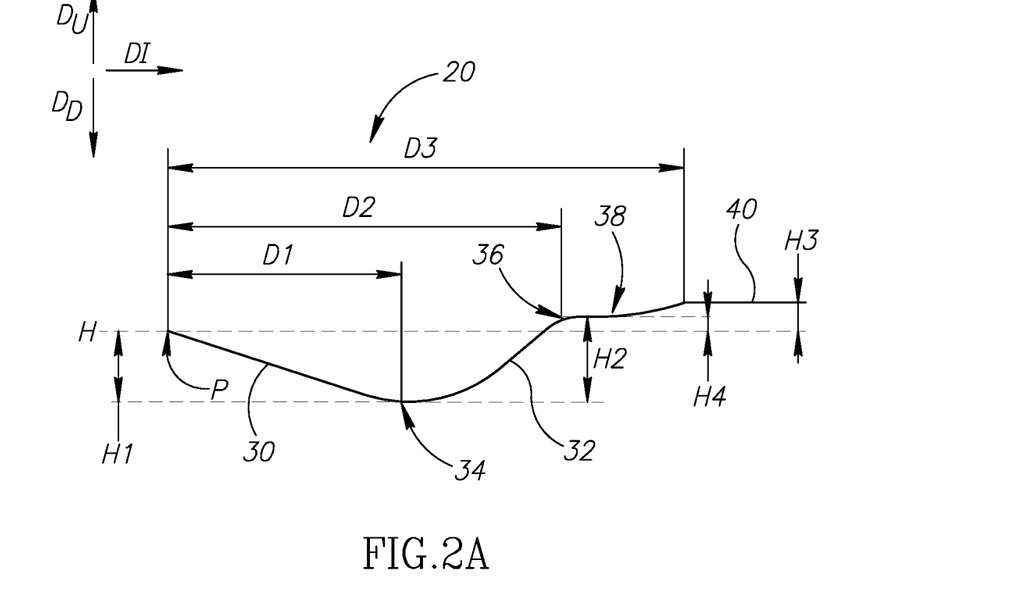
FIG. 2A is a cross section taken along line B-B in FIG. 1C.

As seen in FIG. 2A, in cross-section, the groove 28 comprises a descending surface 30 extending directly from the cutting edge 22 and an ascending surface 32.

Referring to FIG. 2A, it is shown that the descending surface 30 extends in both the downward direction DD and the inward direction DI (also called a downward-inward direction) to a lowest point 34 of the groove 28 (i.e. considered the lowest point which is closest to the bisector point P), and the ascending surface 32 extends from the lowest point 34 in both the upward direction DU and the inward direction DI (also called a upward-inward direction) to a highest point 36. The highest point 36 is the last portion of the chip forming arrangement 20 which participates in chip formation even though there is a transition portion 38 located between an abutment surface 40 and the highest point 36. To elaborate the transition portion 38 has no chip formation function and is therefore disregarded for the description of the chip forming arrangement 20.

Figure 3A:
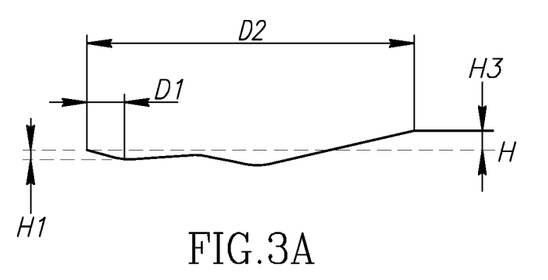
FIGS. 3A-3G are cross sections taken along bisector lines of a comparative designs.
Figure 3B:
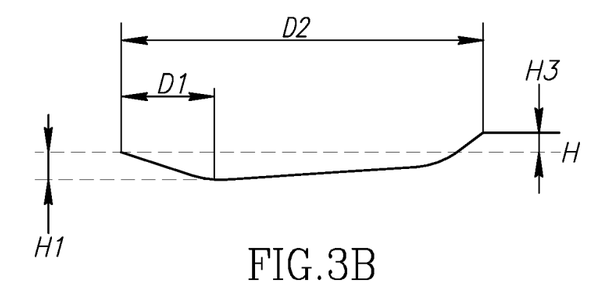
Figure 3C:
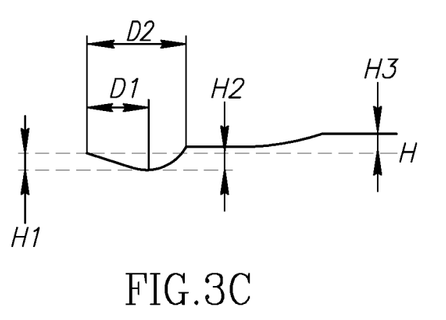
Figure 3D:
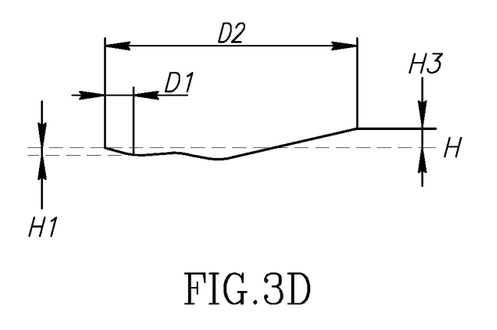
Figure 3E:
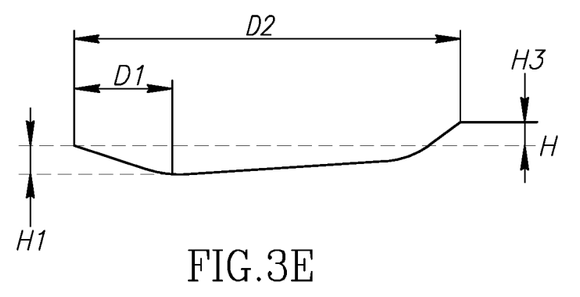
Figure 3F:
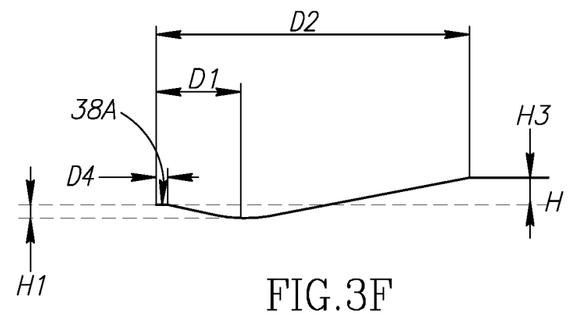
Figure 3G:
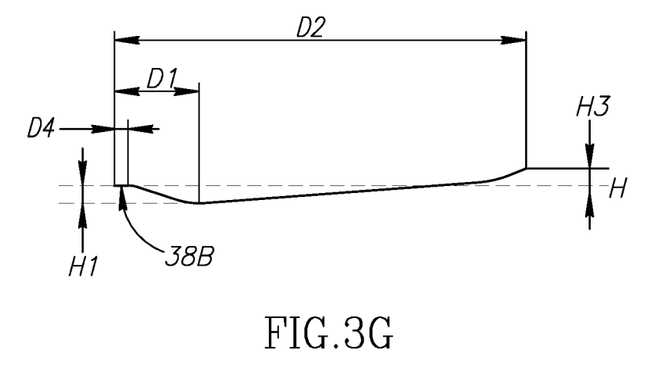

Notably the descending surface 30 extends directly in the downward-inward direction and not initially in the inward direction DI as exemplified by elements 38A and 38B in FIGS. 3F and 3G. Stated differently, the present chip forming arrangement 20 is devoid of a land. Having said that, elements 38A and 38B are also not considered lands for the purpose of the present application because, even though they extend in the inward direction DI, they lack sufficient size to significantly affect chip formation, such size being considered 0.1 mm and larger. In other words, for purposes of the present application, a structure adjacent a cutting edge cannot be considered a "land" unless it is at least 0.1 mm or larger. As shown, until proximity to the lowest point 34, the descending surface 30 extends in a straight manner.

The lowest point 34 is a first horizontal distance D1 from the bisector point P, along the bisector plane P1. In this preferred embodiment condition D1 is 0.85 mm.

The highest point 36 is a second horizontal distance D2 from the bisector point P, along the bisector plane P1. In this preferred embodiment the second horizontal distance D2=1.40 mm. Notably, in FIG. 2B, the comparative distance D2' equals 0.94 mm. Similarly, in all other sections it is also true that D2 is larger than a comparative distance. Thus it will be understood that the second horizontal distance D2 is the largest distance compared to comparative distances (D2' being the exemplified comparative distance). Restated, the v-shaped groove 28 is widest along the bisector plane P1. Furthermore, the v-shaped groove 28 can preferably become progressively narrower along at least a portion of the groove's straight extension portions 28A, 28B, in a direction away from the curved groove portion 2C.

The abutment surface 40 is a third horizontal distance D3 from the bisector point. In this preferred embodiment D3=1.84 mm.

The lowest point 34 is a first vertical distance H1 downward from the horizontal plane H. In this preferred embodiment H1=0.25 mm.

The highest point 36 is a second vertical distance H2 from the lowest point 34. In this preferred embodiment H2=0.30 mm.

A third vertical distance H3 is defined upward from the horizontal plane to the abutment surface 40. In this preferred embodiment H3=0.10 mm.

A fourth vertical distance H4 is defined upward from the horizontal plane to the lowest point of a transition portion 38 (which extends between the highest point 36 and the abutment surface 40). In this preferred embodiment H4=0.05 mm. Nonetheless, it will be understood that the transition portion 38 is optional.

Figure 2B:
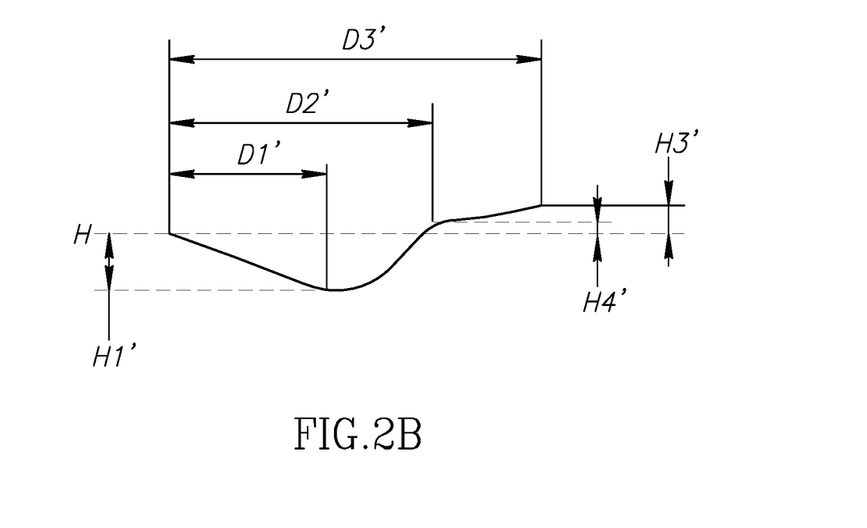
FIG. 2B is a cross section taken along line X-X in FIG. 1C.

For the sake of completeness, the values in FIG. 2B are: D1'=0.47 mm; D2'=0.94 mm; D3'=1.32 mm; H1'=0.2 mm; H3'0.1=mm; H4'=0.04 mm; and H2'=H1'+H4'=0.24 mm. Thus it will be understood that the first vertical distance H1 (=0.25 mm) is the largest distance compared to comparative distances (H1'=0.20 mm being the exemplified comparative distance).

The chip forming arrangement 20 described above was developed and performed best overall against several comparative similar designs, the bisector sections of which are shown in FIGS. 3A to 3G. The comparative values of which are shown in the table below.

|    | FIG. 2A | FIG. 3A | FIG. 3B | FIG. 3C | FIG. 3D | FIG. 3E | FIG. 3F | FIG. 3G |
|----|---------|---------|---------|---------|---------|---------|---------|---------|
| H1 | 0.25    | 0.05    | 0.14    | 0.09    | 0.04    | 0.14    | 0.07    | 0.09    |
| H2 | 0.30    | 0.15    | 0.24    | 0.12    | 0.14    | 0.26    | 0.20    | 0.15    |
| H3 | 0.10    | 0.10    | 0.10    | 0.10    | 0.10    | 0.12    | 0.13    | 0.06    |
| D1 | 0.85    | 0.19    | 0.48    | 0.32    | 0.15    | 0.42    | 0.41    | 0.41    |
| D2 | 1.40    | 1.69    | 1.87    | 0.51    | 1.30    | 1.89    | 1.53    | 2.01    |

Explanatory notes regarding the table are below.

The second vertical distance H2 is not shown in all drawings but is calculated as the sum of the first and third vertical distances H1, H3. Notably this calculation is not accurate for FIGS. 2A and 3C and thus the distance is shown and provided.

In the examples shown in FIGS. 3A and 3D, the chip will be formed by rolling along both relatively shallow grooves, and hence the second horizontal distance D2 extends as far as shown. By contrast, in FIGS. 2A and 3C chip formation already ends at the end of the initial ascent surface (thus ending the functional area of the chip forming arrangement), hence the location of the first vertical distance D1 is as shown. Accordingly, in FIGS. 2A and 3C the sum of the first and third vertical distances H1, H3 is not equal to the second vertical distance H2.

In FIGS. 3A and 3D, dimensions are calculated from the first groove, even though there is difficulty in the analogy because both double grooved arrangements which thus differ from the claimed concept. In any case they have been provided to demonstrate that such designs were tested. In any case, the height of the second groove in both examples is significantly less than 0.15 mm, which is the lower value of the claimed range.

Comparison of test results, taking into account the factors of chip forming (or control), tool life at comparatively low depth of cut and high depth of cut, for both Inconel and Titanium was carried out.

The present design (FIG. 2A) was significantly advantageous over the comparative design in FIG. 3A, in all categories tested.

The present design (FIG. 2A) was significantly advantageous over the comparative design in FIG. 3B, in the categories of tool life (machining Inconel at high depth of cut) and chip control (machining Titanium).

The present design (FIG. 2A) was significantly advantageous over the comparative design in FIG. 3C, in the category of tool life (machining Inconel at high depth of cut).

The present design (FIG. 2A) was significantly advantageous over the comparative design in FIG. 3D, in the categories of tool life (machining Inconel at high depth of cut) and chip control (machining Titanium).

The present design (FIG. 2A) was significantly advantageous over the comparative design in FIG. 3E, in the categories of tool life (machining Inconel and Titanium at high depth of cut) and chip control (machining Titanium).

The present design (FIG. 2A) was significantly advantageous over the comparative design in FIG. 3F, in the categories of tool life (machining Inconel at low and high depth of cut) and chip control (machining Titanium).

The present design (FIG. 2A) was significantly advantageous over the comparative design in FIG. 3G, in the categories of tool life (machining Inconel at high depth of cut, and machining Titanium at low and high depth of cut) and chip control (machining Titanium).

In summary, the present design had the best performance out of all of the designs for machining Inconel at high depth of cut, and outperformed all other designs except one at chip control of Titanium machining (performing a close second). While other values were often equal to the comparative designs, or sometimes inferior, the overall average result of all of the criteria mentioned was the highest for the present design.

The invention claimed is:

1. A cemented carbide turning insert comprising:
opposite first and second surfaces;
a peripherally extending peripheral surface connecting and extending perpendicular to the first and second surfaces;
a peripheral edge formed at an intersection of the peripheral surface and the first surface, the peripheral edge having at least one corner comprising a corner radius;
a cutting edge formed along at least a portion of the peripheral edge, and extending along the corner radius as well as first and second edge portions connected to and extending from different sides of the corner;
a bisector plane P1 perpendicular to the first and second surfaces and bisecting the corner radius;
a bisector point P defined at an intersection of the cutting edge and the bisector plane;
a horizontal plane perpendicular to the peripheral surface and intersecting the bisector point;
a downward direction directed perpendicularly from the horizontal plane towards the second surface;
an upward direction opposite to the downward direction;
an inward direction directed into the insert from an intersection of the bisector plane and the peripheral surface; and
a chip forming arrangement formed at the first surface, adjacent to the cutting edge, the chip forming arrangement being devoid of a land and consisting of a single, continuous v-shaped groove extending on both sides of the corner radius, in a top view;
the groove comprising:
a curved groove portion adjacent the corner radius, and two straight extension portions connected to either side of the curved groove portion;
a descending surface extending directly from the cutting edge in a downward-inward direction to a lowest point of the groove; and
an ascending surface extending from the lowest point in an upward-inward direction to a highest point;
wherein along the bisector plane:
the lowest point is a first horizontal distance D1 from the bisector point, fulfilling the condition 0.50 mm≤D1≤1.20 mm;
the lowest point is a first vertical distance H1 downward from the horizontal plane, fulfilling the condition 0.15 mm≤H1≤0.30 mm; and
the highest point is a second horizontal distance D2 from the bisector point, fulfilling the condition 1.10 mm≤D2≤1.70 mm.

2. The insert according to claim 1, wherein the first horizontal distance D1 fulfills the condition 0.70 mm≤D1≤1.10 mm.

3. The insert according to claim 1, wherein the vertical distance H1 fulfills the condition 0.20 mm≤H1≤0.30 mm.

4. The insert according to claim 1, wherein the second horizontal distance D2 fulfills the condition 1.20 mm≤D2≤1.60 mm.

5. The insert according to claim 1, wherein the chip forming arrangement is symmetric about the bisector plane.

6. The insert according to claim 1, wherein the ascending surface, along the bisector plane, extends in a smooth concave manner.

7. The insert according to claim 1, wherein a majority of the descending surface, along the bisector plane, extends in a straight manner.

8. The insert according to claim 1, wherein the highest point is located upward of the horizontal plane.

9. The insert according to claim 1, wherein the highest point is a second vertical distance H2 from the lowest point, fulfilling the condition H2=H1±0.05 mm.

10. The insert according to claim 9, wherein the highest point is within 0.1 mm of the horizontal plane.

11. The insert according to claim 1, wherein the second horizontal distance D2 is the largest distance compared to comparative distances taken along planes other than the bisector plane.

12. The insert according to claim 11, wherein the v-shaped groove is widest along the bisector plane (P1), and becomes progressively narrower along at least a portion of the groove's straight extension portions, in a direction away from the curved groove portion.

13. The insert according to claim 1, wherein the cutting edge has a circular radius.

14. The insert according to claim 1, further comprising an additional chip forming arrangement having the same features but formed at the second surface.

15. The insert according to claim 1, comprising a chip forming arrangement at each corner of the first and second surfaces having the same features as the chip forming arrangement defined in claim 1.

16. The insert according to claim 1, wherein the cutting edge adjacent the chip forming arrangement extends parallel to the horizontal plane.

17. The insert according to claim 1, wherein the first vertical distance H1 is the largest distance compared to comparative distances taken along planes other than the bisector plane.

18. The insert according to claim 17, wherein the v-shaped groove is deepest along the bisector plane (P1), and becomes progressively shallower along at least a portion of the groove's straight extension portions, in a direction away from the curved groove portion.

19. The insert according to claim 18, wherein the v-shaped groove is widest along the bisector plane (P1), and becomes progressively narrower along at least a portion of the groove's straight extension portions, in a direction away from the curved groove portion.

20. The insert according to claim 1, wherein a ratio D1/D2 is at least 0.5.

* * * * *